United States Patent Office 3,843,344
Patented Oct. 22, 1974

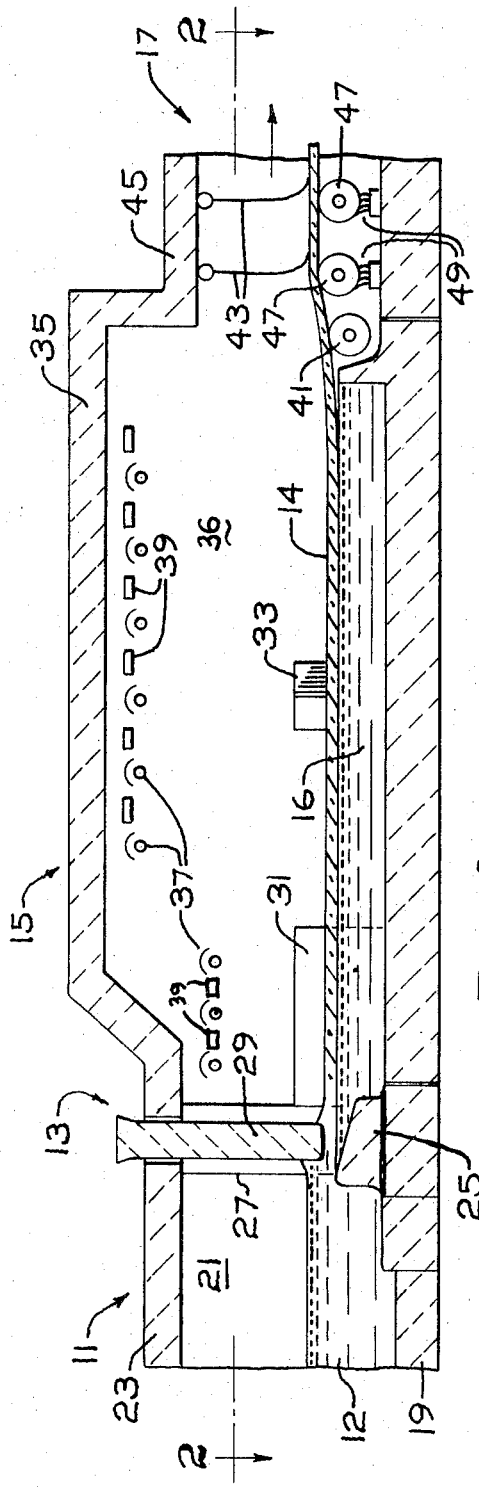
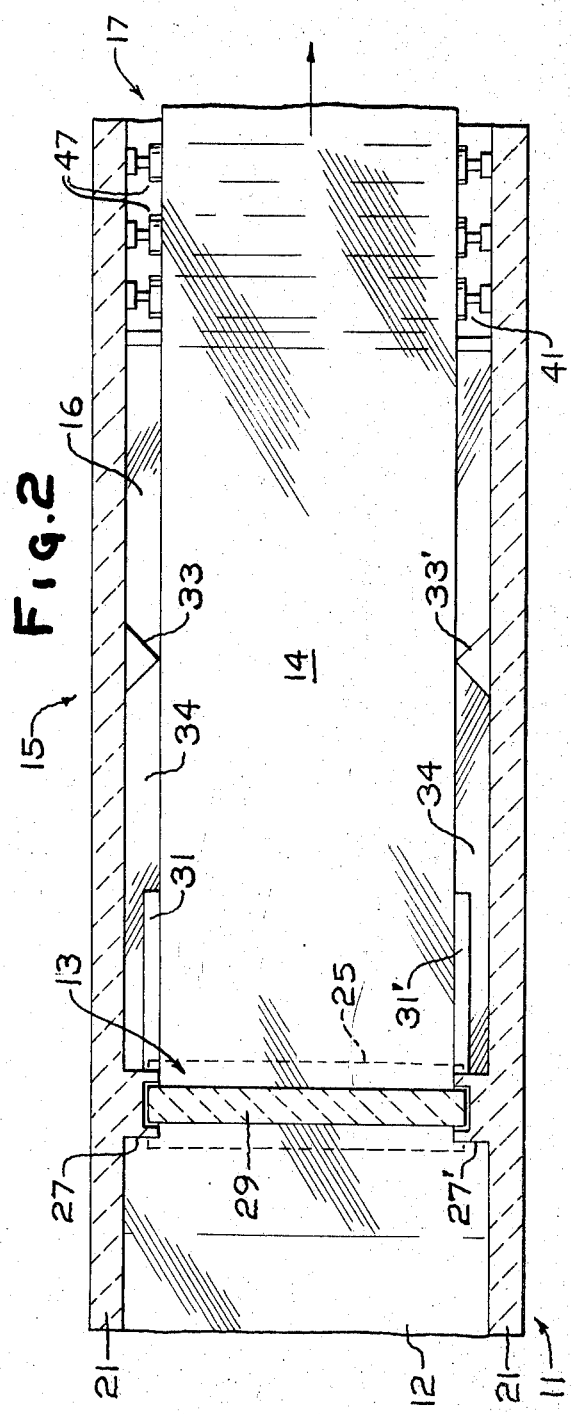

3,843,344
METHOD OF AND APPARATUS FOR FORMING
SHEET GLASS ON MOLTEN METAL
William F. Galey, Saxonburg, Pa., assignor to PPG
Industries, Inc., Pittsburgh, Pa.
Filed Mar. 6, 1973, Ser. No. 338,475
Int. Cl. C03b 18/02
U.S. Cl. 65—65 A                    9 Claims

ABSTRACT OF THE DISCLOSURE

Molten glass flows onto molten metal while yet in the refiner or conditioner of a glass making furnace. The flow is then metered by a tweel positioned over molten metal to continuously deliver molten glass to a float forming operation. The resulting glass has a substantially defect-free bottom surface and can be drawn to any thickness over a wide range of sub-equilibrium to super-equilibrium thicknesses with a minimal variation in throughput control or thermal pattern adjustment during forming.

CROSS REFERENCE TO RELATED APPLICATIONS

This application is related to the following commonly assigned applications, all of which were filed on Mar. 6, 1973 and all of which are specifically incorporated by reference herein: "Manufacture of Thin Glass," Ser. No, 338,474, to Thomas R. Trevarrow and Kenneth R. Graff; "Manufacture of Glass by Contiguous Float Process," Ser. No. 338,497, to Charles K. Edge and Gerald E. Kunkle; and "Delivery of Molten Glass to a Float Forming Process," Ser. No. 338,496, to William C. Harrell and Homer R. Foster.

BACKGROUND OF THE INVENTION

Field of the Invention

This invention relates to the manufacture of a continuous sheet of flat glass by floating molten glass on a pool of molten metal while attenuating and cooling the glass. More particularly this invention relates to method and apparatus for manufacturing glass sheets over a wide range of thickness having improved optical quality and being of controlled width.

Description of the Prior Art

It has been proposed heretofore to form a continuous sheet of glass by depositing molten glass onto a bath, preferably of molten metal having a density greater than the density of the glass, and drawing the glass along the molten metal while cooling it and attenuating it to form a dimensionally stable ribbon or continuous sheet of glass which is then withdrawn from the bath for further processing. Early developments such as those of Heal, U.S. Pat. No. 710,357 and of Hitchcock, U.S. Pat. No. 789,911, disclose the manufacture of flat glass by continuously feeding molten glass into a pool of molten metal to form a ribbon of glass which is cooled and drawn along the molten metal bath to form a finished ribbon of glass.

Glass produced according to these methods has been found to exhibit substantial optical distortion as reported by Pilkington in the file histories of the patents described below (Paper No. 5, pp. 7 and 8 of U.S. Pat. No. 3,220,-816). Optical distortion of a gross nature has thus been attributed in the art to a failure to break up the bottom surface of a discharged stream of glass. A failure to break up the bottom surface has the effect of maintaining imperfections earlier formed in conventionally refined and conditioned glass.

Nearly half a century following the disclosures of Heel and Hitchcock certain developments were made which permitted the commercial development of flat glass manufacture by a float process. These basic developments which have been made in a float process are the subjects of two patents to Pilkington, namely, U.S. Pat. No. 3,083,551 and U.S. Pat. No. 3,220,816. These patents disclose that molten glass, when discharged onto a pool or bath of molten metal, will spread laterally if unhindered to an equilibrium width and thickness and that a continuous ribbon of glass can be drawn from the molten glass which has spread out and is floating on the molten metal. These patents further disclose pouring molten glass onto molten metal in a manner such that the glass is allowed to fall freely onto the molten metal. The molten glass then separates into a rearwardly flowing stream and a forwardly flowing stream. According to one of these patents the rearwardly flowing stream is comprised of glass which has been in contact with a refractory discharge member and has been contaminated by such contact, and this portion of glass spreads outwardly into the marginal portions of the finished ribbon and can be conveniently removed from the finished ribbon. These discoveries have permitted the formation of equilibrium thickness glass ribbons which have satisfactory surface quality and satisfactory chemical homogeneity for most present commercial uses.

However, as further developments have occurred, particularly those related to making thicker or thinner than equilibrium glass, workers in the art of glass manufacture have found that the commercially useful processes for making flat glass which depend upon the lateral unhindered flow of glass to its initial forming stages and which depend upon the free fall and rearward flow of at least a portion of the glass contribute to optical distortion in the finished glass which is unsatisfactory for uses which require glass of substantially higher optical quality than was required even a few years ago. For example, in the making of windshields from glass formed by the float process it has been found desirable to employ glass which is relatively thin, that is glass which is thinner than equilibrium glass and is of the order of .060 inch to 0.15 inch in thickness and preferably about .090 inch in thickness. Glass made by the float process to thicknesses on the order of less than about 0.15 inch is found to have greater apparent optical distortion than equilibrium thickness glass and great difficulty is encountered in making such thin glass with adequate optical quality to satisfy the requirements for automotive windshields.

The present invention is directed to a method and apparatus for manufacturing flat glass which has superior optical quality and which has further processing benefits which will be evident from the description which follows.

SUMMARY OF THE INVENTION

Molten glass is melted and refined in a conventional glass furnace having a melting section and a refiner or conditioner. Molten glass is withdrawn from the conditioner onto a bath of molten metal. The molten metal extends into the conditioner a short distance. Glass is discharged from the conditioner through an opening of generally elongated rectangular shape with its bottom boundary defined by the molten metal extending into the conditioner, its top boundary defined by a metering barrier, such as a tweel, and its marginal sides defined by side jambs or walls. The spacing between the top member and the molten metal beneath the glass is relatively much less than the spacing between the side jambs so that molten glass flowing through the cross-sectional area has a width defined by the distance between the side jambs which is many times greater than its thickness as initially defined by the spacing between the tweel and the molten metal.

The molten glass passes from the conditioner onto a large pool of molten metal, such as tin or a tin-containing alloy. The molten glass travels horizontally, as shown in the appended drawings. The glass is not allowed to fall freely onto the molten metal as in conventional float glass manufacture for such free fall disrupts the uniform glass flow which has been established in the conditioner.

As the molten glass proceeds downstream through the conditioner toward the float-forming chamber, it is gradually cooled to a suitable temperature and, thus, viscosity, for forming. The temperature of the glass close to the discharge opening is from 2100° F. to 2300° F. and preferably 2200° F. to 2250° F. along the center of the furnace about one to two feet upstream from the discharge opening. More important than the precise glass temperature is the viscosity of the delivered molten glass. The $\log_{10}$ viscosity should be between about 2.60 to 3.30 and preferably between about 2.70 and 3.0. The glass flows relatively faster toward the forming chamber at its upper exposed surface than below the surface. Typically, forward flow diminishes to zero from one-half to two-thirds the depth, and a return flow is expected near the bottom.

Upstream of the discharge opening and beneath the surface of the molten glass is an upstream barrier for containing the molten metal which extends into the conditioner. This barrier may be a raised portion of a threshold block which extends transversely across the end of the furnace or may be a separate threshold block extending transversely across the refiner or conditioner beneath the surface of the glass. This barrier may extend only slightly or may extend to a greater height above the level of molten metal. The barrier should extend upward far enough to substantially prevent molten metal spillage over it. The barrier should not extend so high as to permit glass stagnation immediately downstream of it for undesirable devitrification may result.

The barrier is positioned sufficiently far upstream so that the glass is at such a temperature while passing over it to avoil being permanently marked thereby. Marking of the bottom surface of glass in conventional delivery systems is believed to be a complex function of temperature, viscosity, glass composition and contacting material. In this practice of this invention marking is insignificant.

The barrier may be provided with heating means or with cooling means. Electrical heating rods may be inserted through the barrier or the block of which it is a part. Coolant pipes may be inserted through the barrier or its block, or conventional water boxes may be positioned adjacent to it.

The threshold block may be constructed of metal but preferably is a refractory member, such as fused silica. In the event wear of the threshold block is feared excessive near the triple point where molten metal, molten glass and the block meet, a layer of graphite or the like may be placed against the block beneath the metal surface. Alternatively, the block may be clad with platinum or other suitable inert metal.

After molten glass passes over the barrier and onto the molten metal, it is engaged by a tweel which meters the forward flow of molten glass.

The tweel, which impinges against the molten glass, may be constructed of fused silica and may be platinum clad on at least one face (particularly that face facing the oxidizing atmosphere of the conditioner), or it may be a molybdenum member. Alternatively, a mechanical barrier may be provided which is closely spaced away from the surface of molten glass, and this barrier may be provided with gas discharge nozzles which are used to provide a gaseous barrier between the source of molten glass and the forming region. Due to the relatively great width of the discharge space compared to the height of the space, small variations in height result in substantial variations in cross-sectional areas.

In the practice of this invention the molten glass flowing beneath the tweel is freely flowable. That is, the glass is sufficiently hot so that its viscosity is low and, thus, so it cannot support an imposed stress but will flow to relieve the stress. In general, the $\log_{10}$ viscosity will be less than about 3.0. This contrasts with glass at a temperature and viscosity suitable for sizing where the $\log_{10}$ viscosity will be above about 6.5.

This requirement for precise control in the delivery of wide, shallow streams of molten glass is easily met in the present process. Because the tweel impinges on molten glass which is supported by molten metal, the area available for glass flow is not so sensitive to tweel movement as in a process where the molten glass is supported by a rigid support. This insensitivity is a side benefit to the present invention for it results in greater throughput stability than is attainable in other wide delivery float glass processes. When using equivalent tweel control devices and methods as are used in known float glass processes, adjustments to the tweel height do not result in surges of glass flow in the present process.

In this process the depth of molten metal directly beneath the tweel varies as the tweel moves up or down. The depth of molten metal beneath the tweel depends upon the hydraulic pressures of molten metal and molten glass in the vicinity of the tweel.

In the present method glass which is flowing at the exposed surface of the glass in the source of molten glass prior to exit through the discharge means is maintained substantially at or near the top surface of the ribbon throughout its formation. Glass which enters the discharge means in contact with the molten metal barrier or threshold block substantially forms the bottom surface of the finished glass ribbon which is maintained in contact with the molten metal throughout formation. The bottom of the ribbon is substantially free of any marking because of limited contact with the threshold and because its contact temperature is sufficiently high to avoid retention of any marking which may occur. In the preferred embodiments glass which enters the discharge means at the sides of the stream of flowing molten glass remains in substantially the same position in relation to the finished ribbon. The total effect of these flow conditions which are established and maintained throughout the process of transferring molten glass from a molten glass source to and through a forming chamber is responsible for the improved optical quality of the finished glass made by the present method.

In a preferred embodiment the width of the stream of molten glass is defined by substantially parallel guide members extending along the path of travel and substantially hindering any outward flow or movement of the molten glass, particularly while the temperature of the molten glass remains high and the viscosity remains sufficiently low to permit substantial lateral flow. These side members may be short, forming part of the sides of the glass discharge means, or may extend a substantial distance downstream. The side members are preferably comprised of material which is substantially wet by the molten glass within a region along the path of glass travel along their length but which are substantially not wet by the glass at their ends which are contacted by glass which has cooled to some extent. The side members may be provided with means for heating or cooling them to control the extent to which they are wet by molten glass. Also, a lubricating material may be supplied between the molten glass and the side members. The side members are sufficiently isolated from the external environment to prevent undue cooling of the glass along its marginal portions. An important feature of this invention is that glass flowing in the marginal region adjacent the side members has a sufficiently high temperature and low viscosity such that excessive drag is not imposed upon the glass as in Heal's and Hitchcock's early glass manufacturing methods. Therefore, the glass produced by the present method is not plagued with "herringbone" distortion in its marginal portions. The term "herringbone" distortion is a term understood by glassmakers to mean a repeating angular distortion near the margins of a ribbons of glass.

The ribbon of glass moving downstream from the space between the side members is subjected to further cooling and tractive forces along its direction of travel to attenuate the glass to its final thickness. In a preferred embodiment thermal patterns and forces are established to maintain the glass during forming at substantially the same width as the glass at its point of exit from confinement between the guide members. In this embodiment variation in width is generally less than ±5% of the average ribbon width, and the ribbon experiences less than 5% general contraction in width while being conveyed along the bath of molten metal.

This invention may be further understood from the appended drawings.

BRIEF DESCRIPTION OF THE DRAWINGS

FIG. 1 is a longitudinal sectional view of a glass making apparatus having a discharge section for delivery of molten glass onto molten metal just upstream of a metering tweel separating the furnace oxidizing atmosphere from the forming chamber reducing atmosphere;

FIG. 2 is a plan sectional view of the apparatus shown in FIG. 1 taken along section line 2—2;

Figure 3:
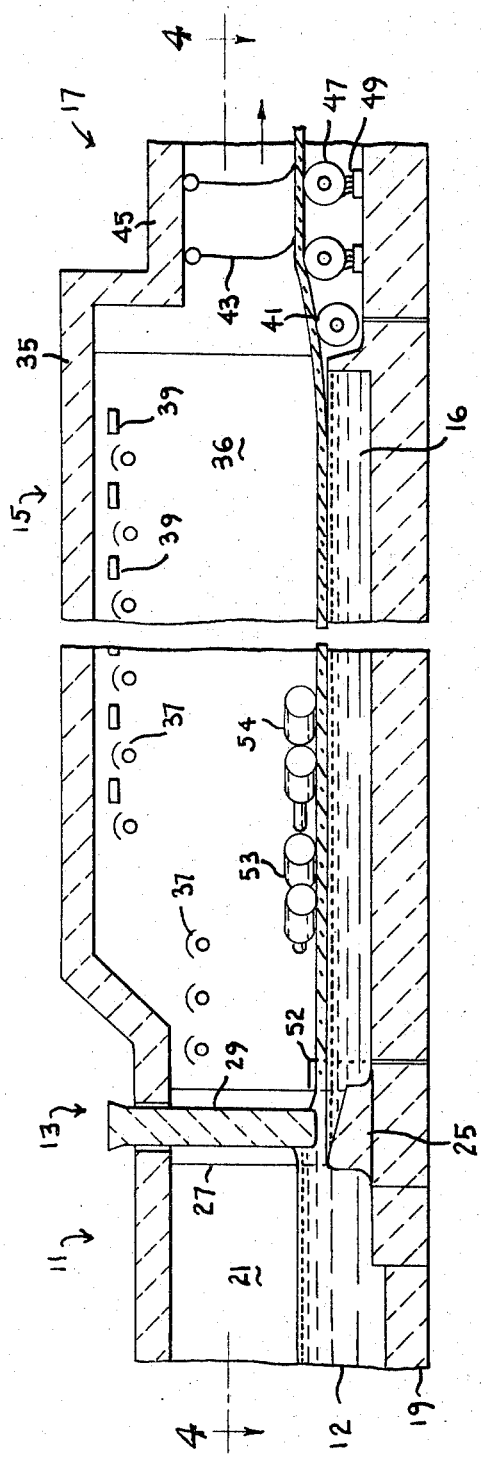
FIG. 3 is a longitudinal sectional view of a particular embodiment of this invention in which the molten glass is permitted to laterally spread upon delivery onto the molten metal.

This invention may be appreciated in detail from the descriptions of the preferred embodiments which follow.

DESCRIPTIONS OF THE PREFERRED EMBODIMENTS

Referring now to the drawings, especially FIGS. 1 and 2, there is shown an apparatus for producing glass according to the method of this invention. A furnace or source of molten glass terminating in a refining or conditioning zone 11 containing molten glass 12. This molten glass conditioner 11 is connected through a discharge means 13 to a forming chamber 15. The forming chamber 15 has within it a pool of molten metal 16. The molten metal has a density greater than the density of glass and is preferably tin or a tin alloy. The molten metal 16 extends upstream into the conditioner 11 for a short distance. Molten glass 12, flowing onto the molten metal 16, is drawn along the surface of the molten metal and cooled to form a dimensionally stable continuous ribbon of glass 14 which is withdrawn from the forming chamber 15 by means 17. The glass withdrawing means 17 is employed to lift the finished sheet of glass 14 from the molten metal 16 and carry it out of the forming chamber 15.

The conditioner 11 comprises a refractory floor 19, side walls 21 and a roof 23. In general, the space enclosed by the side walls 21 and the roof 23 over the molten glass 12 is an oxidizing atmosphere. Access may be provided into this space to measure the temperature of the molten glass and other conditions affecting glass viscosity and flows, for example. The molten glass refiner conditioner 11 is so constructed and operated that glass passing through it toward the discharge means 13 is gradually cooled. The molten glass 12 is cooled to a temperature at which it is flowable and yet with some further cooling may be formed into a dimensionally stable sheet of glass. For glasses of typical soda-lime-silica composition the temperature of the glass in the glass conditioner near the discharge means is from about 1700° F. to about 2200° F.

The discharge means 13 comprises a threshold block 25 which separates the pool of molten metal 16 from the main pool of molten glass 12 within the conditioner 11. The threshold block 25 is shaped and constructed in a fashion such that it permits only limited contact between its upper surface and molten glass as molten glass passes over it and onto the molten metal. The upper surface of the threshold block 25 is typically from 2 to 18 inches below the upper surface of the molten glass 12 in the conditioner. Its depth beneath the upper surface of a molten glass immediately downstream of the discharge means in the forming chamber 15 is typically much less than upstream thereof. This distance varies depending upon the throughput and temperature of the molten glass. The threshold block may be provided with means for heating or cooling it in order to control the temperature of glass flowing over the threshold and onto the molten metal.

The discharge means 13 further comprises side jambs 27 and 27' which define the sides of a channel through which molten glass 12 may flow. Discharge means 13 also comprises an adjustable metering means 29 extending downwardly into the molten glass over the molten metal. This metering means 29 is essentially a movable gate or tweel which may be adjusted upward or downward to control the sides of the elongated, horizontal slot formed by the molten metal adjacent to threshold block 25, the side jambs 27 and 27' and the metering means or tweel 29.

Depending upon the vertical position of the tweel 29, a stream of molten glass flows through the discharge slot from the conditioner 11 into the forming chamber 15. The molten glass first flows onto the molten metal over the threshold block 25 at a temperature and viscosity such that permanent marking on the bottom surface of the glass contacted by the threshold 25 is substantially prevented. The molten glass then flows beneath the tweel 29 and into the forming chamber 15. The lateral dimension of this stream of flowing molten glass is first defined by the distance between side jambs 27 and 27'. This dimension may be maintained by providing guides or restraining members 31 and 31'. The restraining members 31 and 31' are substantially parallel guides comprised of material such as graphite or alumina which is wet to a limited extent by hot molten glass. The restraining members 31 and 31' may optionally be provided with means for temperature control, such as means for heating or cooling restraining members. In a preferred embodiment described and claimed in the copending application of Thomas R. Trevorrow and Kenneth R. Graff a longitudinal temperature gradient may be established along each restraining member so that there is relatively more wetting of the restraining member by the glass at the upstream end of the member than at the downstream end of the member.

The principles of this invention may also be combined with the principles described in U.S. Pat. No. 3,356,479 to W. F. Galey in which a fused salt is provided floating on the molten metal downstream of the discharge region in order to restrain the outward or lateral flow of the molten glass. When practicing this optional feature, side dams 33 and 33' are provided downstream in a forming chamber where the glass is sufficiently cooled so that marking or disturbing of the glass is unlikely. A fused salt layer 34 is then confined within a space confined by the side walls of the forming chamber 15, downstream dams 33 and 33' and the restraining members 31 and 31', as well as the glass sheet 14 which is being formed.

The forming chamber 15 is enclosed by an overhead roof 35 and side walls 36. Mounted along the roof 35 of the forming chamber 15 and facting the top surface of floating continuous ribbon of glass 14 are a series of heaters 37 and coolers 39. These provide for the controlled heating or cooling of a moving ribbon of glass 14 so that the glass may be attenuated and cooled to a dimensionally stable ribbon of desired width and thickness before being removed from the forming chamber. Also connected to forming chamber 15 is a source of inert gas (not shown) and preferably also a source of reducing gas (not shown) to prevent the oxidation of molten metal in the forming chamber. While these sources are not shown, they are similar to those known in the art and disclosed in U.S. Pat. No. 3,337,322. Generally, the gas sources are used to direct nitrogen and hydrogen into the chamber.

At the downstream end of the forming chamber 15 there is mounted a take-out roll 41 disposed transversely across the path of glass movement. The roll 41 supports the ribbon of glass 14 and lifts it up from the molten metal bath 16. A series of barriers 43 engage the upper surface of the ribbon of glass 14 to isolate the atmosphere in the forming chamber 15 above the surface of glass from downstream processing equipment. The barriers 43 preferably comprise flexible asbestos sheeting mounted and depending from a roof member 45 extending from the roof 35 of the forming chamber 15.

The take-out means 17 comprises, in addition to take-out roll 41 and barriers 43, a series of rolls 47 which support the glass and apply a longitudinal tractive force to the glass drawing it from the forming chamber 15 and carrying it to further processing apparatus such as an annealing lehr. Mounted in contact with the rollers 47 are brushes 49 which serve to isolate the forming chamber from later processing apparatus.

In practicing a preferred embodiment of this invention, sufficient tractive force is applied to the glass from rollers 47, as well as downstream rollers, to unidirectionally attenuate the glass to its desired final thickness. When it is desired to make a glass having a final thickness which is less than equilibrium thickness, it is of particular importance to control the tractive force applied to attenuate the glass. In the embodiment of this invention, which is shown in FIGS. 1 and 2, it has been found that by appropriate control of the temperature and temperature gradient along the restraining members 31 and 31′ and by appropriate application of tractive force of the glass by rollers 37, a glass may be produced having a thickness less than equilibrium thickness without the further assistance of lateral folding members and without lateral stretching as in the prior art, such as described in U.S. Pat. Nos. 3,222,154, 3,493,359 and 3,695,859. This particular feature of such an embodiment of this invention permits the production of thin glass having substantially less optical distortion, particularly near its margins, than is apparent in glass produced by conventional float-forming processes. This concept is the subject of the copending application of Thomas R. Trevorrow and Kenneth R. Graff.

Figure 4:
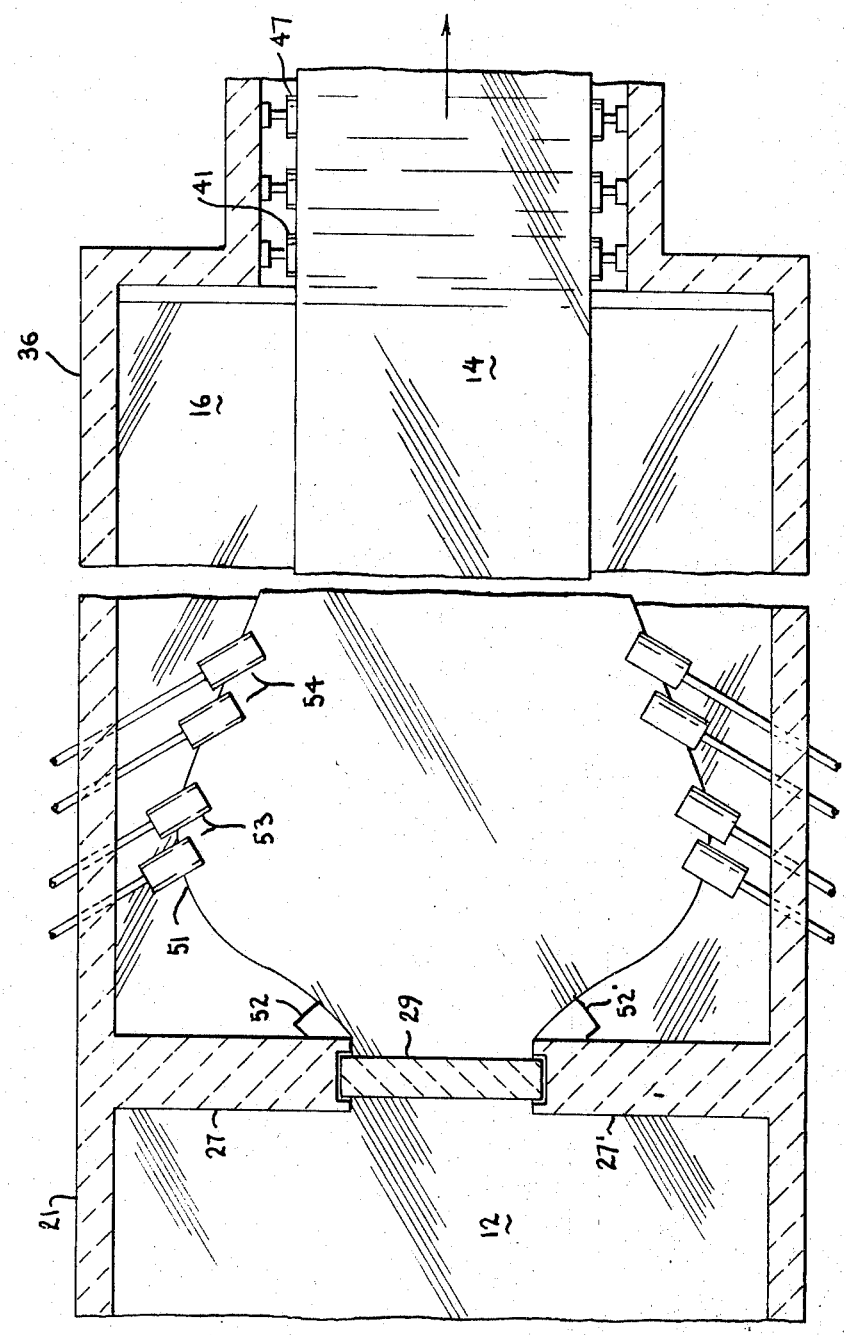
FIG. 4 is a plan sectional view of the apparatus shown in FIG. 3 taken along section line 4—4.

Positive lateral restraint or stretching may, however, be used to attenuate a glass ribbon while maintaining substantially constant ribbon width or while allowing the glass width to be drawn down as its thickness is drawn down. This particular embodiment of the present invention is shown in FIGS. 3 and 4. Referring now to FIGS. 3 and 4, there is shown another embodiment of the present invention wherein molten glass is permitted to flow outward laterally immediately after entering the forming chamber and then is attenuated both in width and thickness to form a finished dimensionally stable continuous ribbon of glass. In FIGS. 3 and 4 all of the elements commonly numbered as in FIGS. 1 and 2 are the same. After molten glass 12 flows out onto molten metal 16, it is allowed to spread substantially unhindered laterally outward to reach an equilibrium or near equilibrium width. The fully spread body of molten glass, designated 51, corresponds to the full spread "onion" occurring in conventional float-forming operations. Although not necessary, the float-forming chamber 15 may be provided with angled guides or restraining members 52 which initially guide the glass away from the discharge means 13 and prevent glass from fully wetting the downstream side of jambs 27 and 27′ with consequent stagnation and devitrification in this area. The guides 52 are preferably constructed of graphite and may be cooled by water pipe cooling means or other means to minimize the extent to which glass wets the guides 52. After the glass is fully spread, it is engaged by rolls or other lateral holding or stretching devices 53 and 54. These devices are preferably wheels which engage only the top surface of the glass such as the wheel of Bishop (see U.S. Pat. No. 3,709,673). Preferably, wheels or rolls 53 and 54 are operated at controlled rotational speed and positioned with appropriate outward angles and at appropriate distances into the float-forming chamber so that the glass is attenuated both in width and thickness to its final desired width and thickness and is drawn down from its full spread 51 to its final width for lift-out and withdrawal from float-forming chamber 15. The rolls may be disposed singly at several spaced locations moving downstream through the forming chamber or pairs of rolls may be positioned in tandem on each side of the glass during forming. When pairs of rolls are available, they may be operated together or separately with one serving as a back-up for the other.

Figure 5:
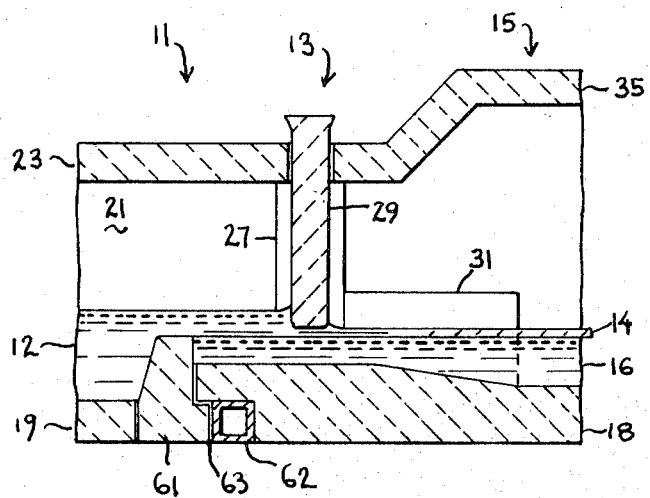
FIG. 5 is a partial, longtiudinal sectional view of a particular embodiment of this invention having a separately removable threshold block which may be easily replaced as needed.
Figure 6:
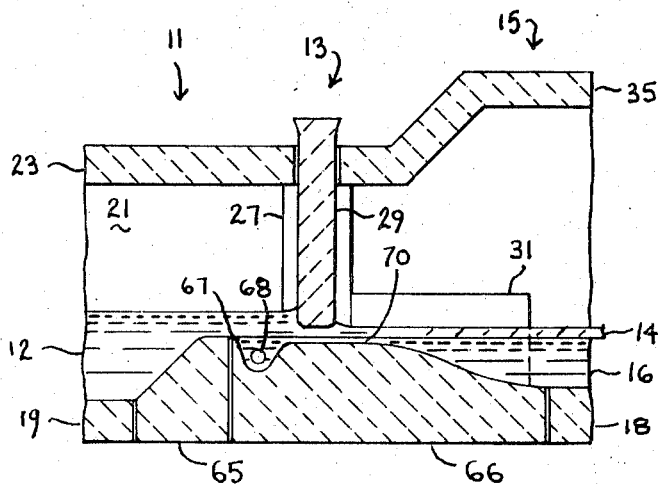
FIG. 6 is a partial, longitudinal sectional view of a particular embodiment of this invention which provides a thin, flowing support of molten metal and has the particular utility of providing thermal control in the discharge section by the continuous supply of thermally controlled molten metal.

Detailed views of two preferred embodiments of the delivery means which may be employed in the practice of this invention are shown in FIGS. 5 and 6. In FIG. 5 the delivery means 13 is provided with a relatively deep pool of molten metal 16 extending beneath the tweel 29. This is accomplished by providing a threshold block 61 which extends transversely across the width of the conditioner beneath the surface of molten glass in the conditioner, which retains the molten metal 16 and prevents it from being lost into the furnace. The threshold block 61 is comprised of a material such as fused silica or the like. Or, it may be a platinum clad refractory block or molybdenum, graphite, boron nitride or the like. In a preferred embodiment the thresold block 61 is separated from the bottom of the forming chamber by powdered graphite 63 which fills the void between the threshold block 61 and the bottom of the forming chamber 18. Also in a preferred embodiment a water box 62 is provided for cooling the threshold block 61 and thereby to provide both temperature control in the discharge region and prevent the undue or excessive wear in the threshold block 61.

This embodiment of the present invention is particularly useful because of the stability of molten glass flow rate that may be attained when employing such apparatus. The amount of glass passing through the discharge means 13 is controlled by the space between the bottom of the tweel 29 and the molten glass-molten metal interface below the tweel. A downward thrust of the tweel combined with the differing hydrostatic pressures behind the tweel in the glass conditioner and in the forming region downstream of the tweel causes a variation in depth of the molten-glass surface with respect to the elevation of the horizontal plane of the support. In general, the molten glass-molten metal interface will be lower beneath the tweel 29 than it is either upstream or downstream of the tweel 29.

Another embodiment of the present invention is illustrated in FIG. 6. In this embodiment a thin lubricating film of molten metal is provided between the supporting refractory member defining the bottom of the glass discharge channel and the molten glass. In this embodiment the molten glass 12 flows from the conditioner 11 over a threshold block 65 and then over a supporting member 66. After flowing over the threshold block 65, the molten glass flows over a relatively shallow pool of molten metal 67 maintained in the depression in the support block 66. Molten metal is supplied to the shallow pool 67 from a supply means 68, which comprises a pipe connected to a source of molten metal (not shown). The stream of molten glass flowing through the discharge means exerts a drag upon the molten metal in the pool 67, forming a lubricating film 70 of molten metal and carrying the molten metal through to the main body of molten metal 16 in the forming chamber. A particular advantage of this embodiment is that formation of a thin lubricating film of molten metal provides a sufficiently long discharge path of precise cross-sectional dimensions to form a finished sheet of glass of finely controlled thickness without resort to elaborate attenuation and thermal control throughout the forming chamber.

This invention will be further appreciated from a detailed example which follows.

EXAMPLE

A soda-lime-silica glass comprising a composition having about 73% silica, about 14% soda and about 13% calcia and magnesia with smaller amounts of alumina, iron, potassia and the like is melted in a conventional regenerative glass making furnace. The furnace has a conditioning zone about 90 feet long and about 30 feet wide. Disposed across the conditioning zone about 12 inches beneath the exposed surface of molten glass with its top surface about 12 inches below the surface of molten glass is a threshold block such as shown in FIG. 5. The threshold block is constructed of fused silica and has a top surface which is about 8 inches wide (as from left to right in FIG. 5). The downstream edge of the top surface of the threshold block is about 2 feet upstream from a tweel.

The apparatus is also provided with a shutoff tweel upstream of the threshold block which extends the full width of the conditioner and may be dropped into the molten glass behind the threshold tweel for replacement. This shutoff is a water-cooled, steel jacketed gate which freezes the glass in place in order to replace the threshold block or the tweel. Its function is related only to repair and replacement of elements in the process, and it is, thus, not shown in any of the drawings. The width of the discharge between the side jambs is about 10 feet. The tweel is constructed of fused silica and is suspended down into the chamber in contact with the side jambs. It engages the molten glass. The floor of the forming chamber is about 4 inches below the top surface of the threshold block so that a relatively deep pool of molten metal is provided beneath the tweel and extending back to the threshold block as shown in FIG. 3.

The overall structure is similar to that shown in FIGS. 3 and 4 although the details of the threshold and tweel area are as shown in FIG. 5. Immediately downstream of the side jambs there are provided two angled guide members made of graphite which extend about 24 inches along their greatest dimension facing the glass. These are angled out from the face of the jambs facing the forming chamber.

Molten glass is delivered beneath the tweel at a temperature of about 2000° F. at a rate of about 450 tons per day. It is allowed to spread from the guide outwardly until its maximum width is about 22–26 feet. Just downstream of its location of maximum width it is engaged by a pair of top roll machines, such as those described in U.S. Pat. No. 3,709,673. These roll machines are positioned to engage the top surface of the glass about 8 inches in from its marginal edges and are angled so that their rotation provides a force angled about 3 degrees outward from lines parallel to the general movement of glass through the forming chamber. Two additional pairs of edge machines are provided downstream of the point of maximum width. They are operated at outward angles of 7 and 10 degrees, respectively, and all are operated at sufficient rotational speed to provide for the gradual and uniform attenuation of the width and thickness of the glass. The spacing between the adjacent machines is about 10 feet. The edge-roll speed of the first set of machines is about 70 inches per minute, that of the second is about 110 inches per minute and that of the third is about 150 inches per minute. The width of the ribbon at the second pair of machines is about 210 inches. The width of the ribbon at the third pair of machines is about 190 inches. The ribbon gradually narrows to 140 inches and is then withdrawn from the process. The thickness of the glass that is withdrawn from the process is .065 inch, which, of course, is substantially less than the thickness of glass formed to an equilibrium thickness. The glass has a distortion quality which is equal to that of conventional commercial float glass. It has a bottom surface which is of substantially higher quality than that produced by conventional commercial float-forming processes.

While this invention has been disclosed and described with reference to specific embodiments, it should not be construed to be limited by this description. The specific description is intended to point out the preferred embodiments of the invention and to disclose the best modes of carrying out this invention. Those skilled in the art of glass manufacture wil realize that the principles of this invention may be utilized in other processes and may be used in combination with other developments while taking advantage of the particular utility derived from the practice of this invention itself.

What is claimed is:

1. In the apparatus for manufacturing a continuous sheet of glass comprising a glass making furnace, having a melting region and a refining and condition region; a forming chamber, having therein a pool of molten metal and a protective atmosphere thereabove, connected to said furnace at its refining and conditioning region through means for delivering molten glass from said furnace refining and conditioning region to said forming chamber onto said pool of molten metal; and means for withdrawing said continuous sheet of glass from said forming chamber, wherein said delivery means includes means for separating said glassmaking furnace from said forming chamber, said operating means sharing an opening through which molten glass may flow, the improvement comprising:

(a) a barrier extending transversely across said conditioning region beneath the opening in said wall, said barrier separating the bottom of said conditioning region into two parts, an upstream part and a downstream part, the downstream part being closest said forming chamber and being in communication therewith; and (b) molten metal in said downstream part of said conditioning region extending through the opening in said separating means and being in communication with and having the same elevation as said pool of molten metal in said forming chamber, the elevation of said molten metal being substantially the same as that of said barrier.

2. The apparatus according to claim 1 wherein said barrier extends transversely less than the width of said conditioning region and greater than the width of the opening in said separating means, and said barrier includes end portions for preventing the loss of molten metal therethrough.

3. The apparatus according to claim 1 wherein the top of the opening in said separating means is the bottom of an adjustable metering member and wherein said barrier has its top surface at an elevation spaced beneath the opening in said separating means and said forming chamber has a floor extending against said barrier at an elevation below said barrier top surface a distance about that of the depth of molten metal in said forming chamber such that the depth of molten metal provided beneath said metering member exceeds the distance between said metering member and the surface of said molten metal.

4. The apparatus according to claim 1 wherein said apparatus further comprises means for controlling the temperature of said barrier.

5. In an apparatus for manufacturing a continuous sheet of glass comprising a glass making furnace, having a melting region and a refining and condition region, a forming chamber, having therein a pool of molten metal and a protective atmosphere thereabove, connected to said furnace at its refining and conditioning region through means for delivering molten glass from said furnace refining and conditioning region to said forming chamber onto said pool of molten metal, and means for withdrawing said continuous sheet of glass from said forming chamber, the improvement comprising.

(a) a barrier extending transversely across said conditioning region beneath the surface of molten glass therein, said barrier separating the bottom of said conditioning region into two parts, an upstream part and a downstream part, the downstream part being closest said forming chamber, being in communication therewith and having molten metal therein; and (b) molten glass delivery means comprising a supporting member beneath said metering member and extending downstream from said barrier, said supporting member having means for supplying molten metal substantially immediately downstream of said barrier beneath said molten glass, and said supporting member having its upper surface sufficiently close to said metering member to provide a thin film of molten metal between said upper surface and molten glass flowing beneath said metering member, said film having a thickness less than the thickness of molten glass flowing beneath said metering member.

6. In the method of manufacturing a continuous sheet of glass comprising the steps of melting batch materials to form molten glass, refining and conditioning the molten glass, delivering a stream of molten glass onto a pool of molten metal, conveying the glass along the surface of said pool of molten metal while cooling it to form a dimensionally stable, continuous sheet of glass and withdrawing said continuous sheet of glass from said pool of molten metal, the improvement comprising (a) supporting said stream of molten glass on molten metal having a thickness less than the thickness of said stream of molten glass during its delivery onto said pool of molten metal; and (b) controlling the delivery of molten glass onto said pool of molten metal by disposing a metering member sufficiently close to said molten metal to provide a space between said molten metal and said metering member through which said molten glass flows while supported on said molten metal.

7. In the method of manufacturing a continuous sheet of glass comprising the steps of melting batch materials to form molten glass and refining and conditioning the molten glass in a glassmaking furnace, delivering a stream of molten glass from the glassmaking furnace onto a pool of molten metal in a forming chamber, conveying the glass along the surface of the pool of molten metal and cooling it to form a dimensionally stable, continuous sheet of glass, and withdrawing the continuous sheet of glass from the pool of molten metal, the improvement wherein:

(a) the stream of molten glass is caused to flow over a barrier in the glassmaking furnace onto the surface of molten metal within the glassmaking furnace, which metal is in communication with the pool of molten metal in the forming chamber; and wherein (b) the stream of glass is supported on the molten metal as it is delivered along a substantially horizontal path from the glassmaking furnace onto the pool of molten metal in the forming chamber, the surface of the pool of molten metal in the forming chamber being maintained at substantially the same elevation as the surface of the molten metal in the glassmaking furnace.

8. The method according to claim 7 wherein the molten glass is delivered between an adjustable metering member and the surface of the molten metal onto the pool of molten metal in the forming chamber and is maintained sufficiently hot during such delivery as to have a $\log_{10}$ viscosity of less than about 3.

9. The method according to claim 8 wherein in the step of delivering said stream of molten glass onto said molten metal, said metering member is moved vertically with respect to a generally horizontal plane defining the surface of said molten glass, and the portion of said flowing molten glass passing between said metering member and said molten metal is varied accordingly, responsive to said movement of said metering member.

References Cited
UNITED STATES PATENTS

| | | | |
|---|---|---|---|
| 3,352,657 | 11/1967 | Charnock | 65—182 R |
| 3,356,479 | 12/1967 | Galey | 65—182 R X |
| 3,433,612 | 3/1969 | Dickinson et al. | 65—99 A |
| 3,721,543 | 3/1973 | Classen et al. | 65—182 R |

ARTHUR D. KELLOGG, Primary Examiner

U.S. Cl. X.R.

65—99 A, 182 B